United States Patent [19]

Jurgens et al.

[11] 4,246,529
[45] Jan. 20, 1981

[54] CURRENT INTEGRATING BATTERY CHARGER

[75] Inventors: Gunter R. Jurgens, Collaroy Beach; Mohammed A. Helal, Harbord, both of Australia

[73] Assignee: Minitronics Pty Limited, Australia

[21] Appl. No.: 951,507

[22] Filed: Oct. 16, 1978

[30] Foreign Application Priority Data

Nov. 4, 1977 [AU] Australia ............................. 2308/77

[51] Int. Cl.³ ............................................. H04J 7/04
[52] U.S. Cl. ....................................... 320/39; 320/43
[58] Field of Search ................................. 320/22–24, 320/32, 43, 39, 40; 323/1, DIG. 1

[56] References Cited

U.S. PATENT DOCUMENTS

| | | | |
|---|---|---|---|
| 3,586,955 | 6/1971 | Kisiel | 320/39 |
| 3,864,617 | 2/1975 | Smith et al. | 320/23 |
| 4,146,832 | 3/1979 | McConnell | 323/DIG. 1 |
| 4,152,635 | 5/1979 | Scott, Jr. | 320/39 X |

*Primary Examiner*—Robert J. Hickey
*Attorney, Agent, or Firm*—Steinberg & Raskin

[57] ABSTRACT

The battery charger employs integrator means and current switch means in combination with a control circuit whereby the control circuit receives a synchronizing signal at the start of each cycle as determined by a cyclical supply or pulse generator as well as information about the state of the integrator means which is compared with the predetermined average current such information determining the required control signals for the integrator means and current switch means so as to maintain the value of the average charging current substantially constant throughout the charging time. Current sense means being provided to sense the current flow through battery and supply the integrator means with said sensed current.

8 Claims, 13 Drawing Figures

CURRENT INTEGRATING BATTERY CHARGER

The present invention relates to a method and apparatus for battery charging and more particularly to the provision of current integrating techniques in battery charging.

The operation of the present invention employs an arrangement wherein the instantaneous charge current is continuously measured and simultaneously integrated, with respect to time, to provide the total charge over any specified period of time. The total charge can then be controlled by switching the charger off when the total charge divided by a preset time period reaches a reference average current for that period. Where the period is constant, the average charge current is also a constant value.

Use of this arrangement lends itself to constant current charging (single rate or dual rate) and constant potential charging by incorporating a battery voltage sense circuit which will vary the charging current in dependence upon the magnitude of the sensed battery voltage.

In one form the present invention provides in a battery charging circuit, battery charging current sense means supplying the sensed current flow through a battery being charged to current integrating means, control circuit means controlling a current switch in series with said battery and controlling periodic starting and resetting of said integrating means, and wherein charging current flows through the battery, the current switch and the current sense means when the voltage of the charging current exceeds the battery voltage after the start of each period, comparator means for comparing the output of the integrating means with a predetermined charging current level, said comparator means being connected to said control circuit means which open circuits said current switch and resets the integrating means when the output of the integrating means attains said predetermined charging current level.

The present invention will now be described by way of example with reference to the accompanying drawings, in which.

Figure 1:
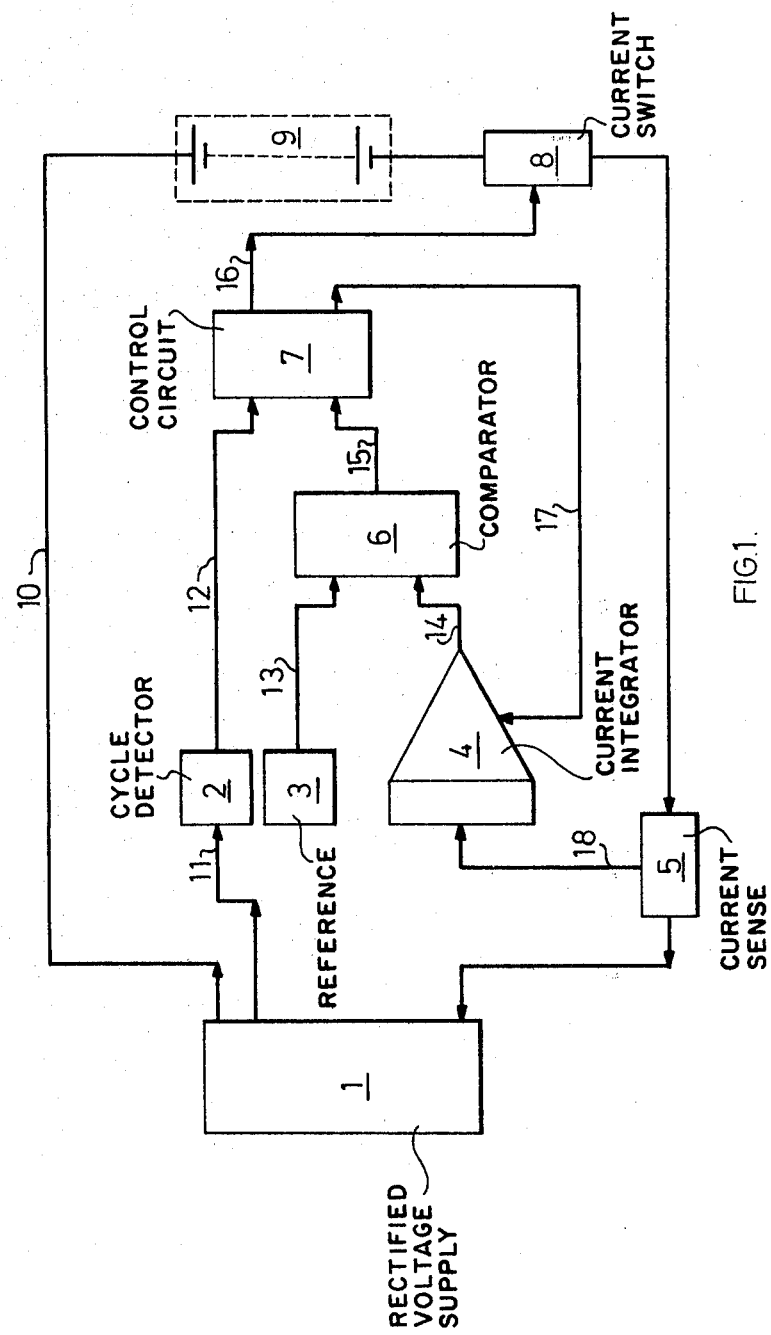
FIG. 1 is a block diagram of a charging circuit in accordance with one form the present invention.
Figure 2:
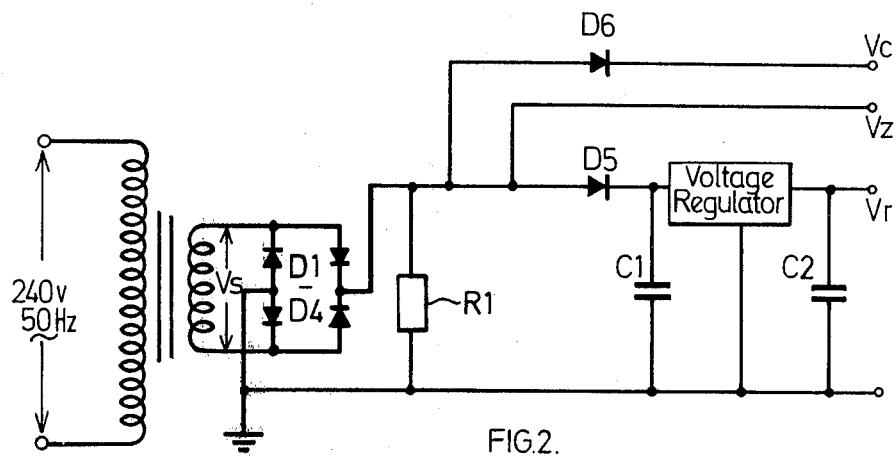
FIG. 2 is a circuit diagram of a typical power supply for a charger in accordance with the invention.
Figure 6:
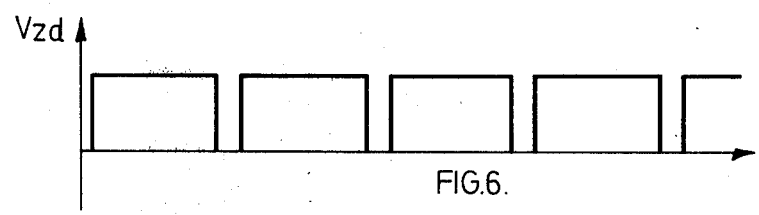
Figure 4:
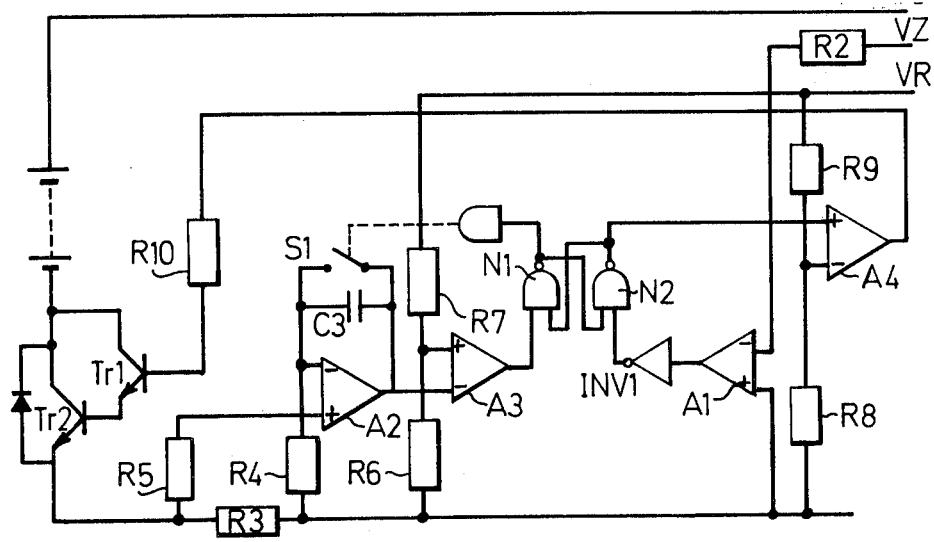
Figure 13:
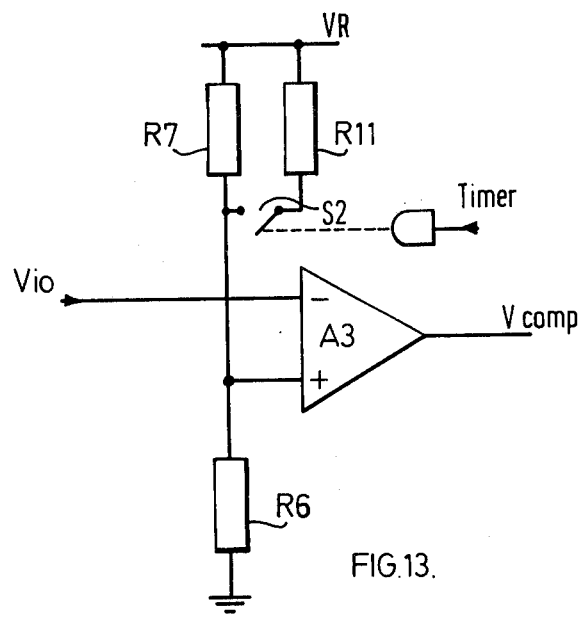
Figure 5:
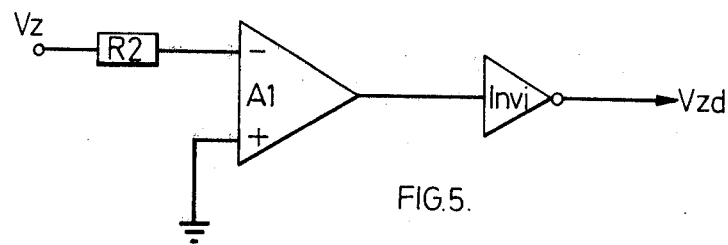
Figure 7:
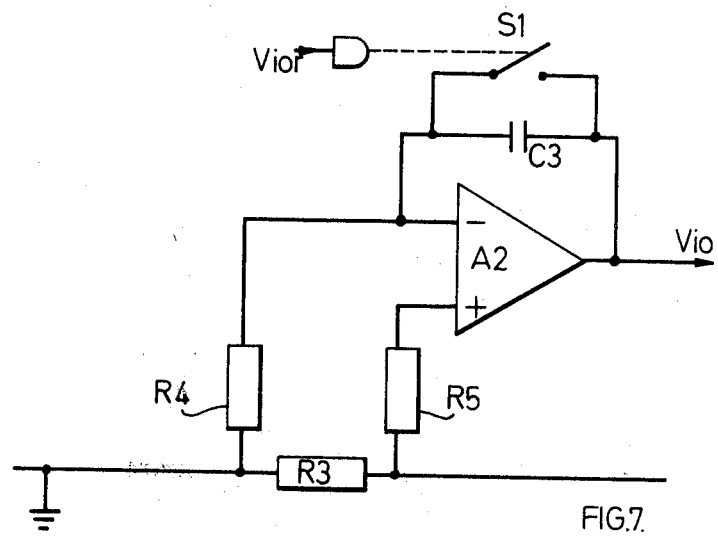
Figure 8:
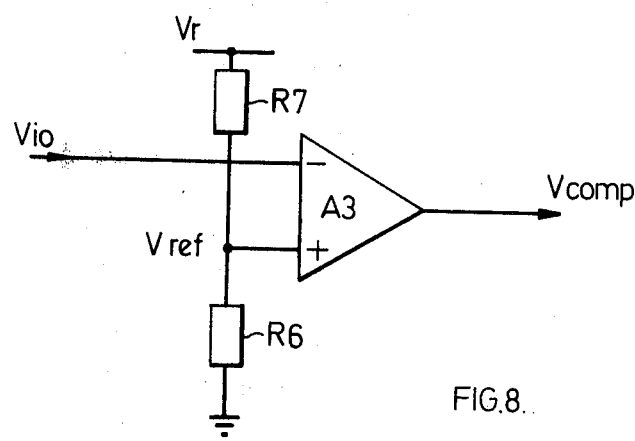
Figure 9:
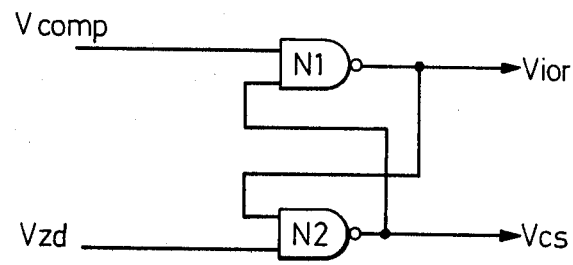
Figure 10:
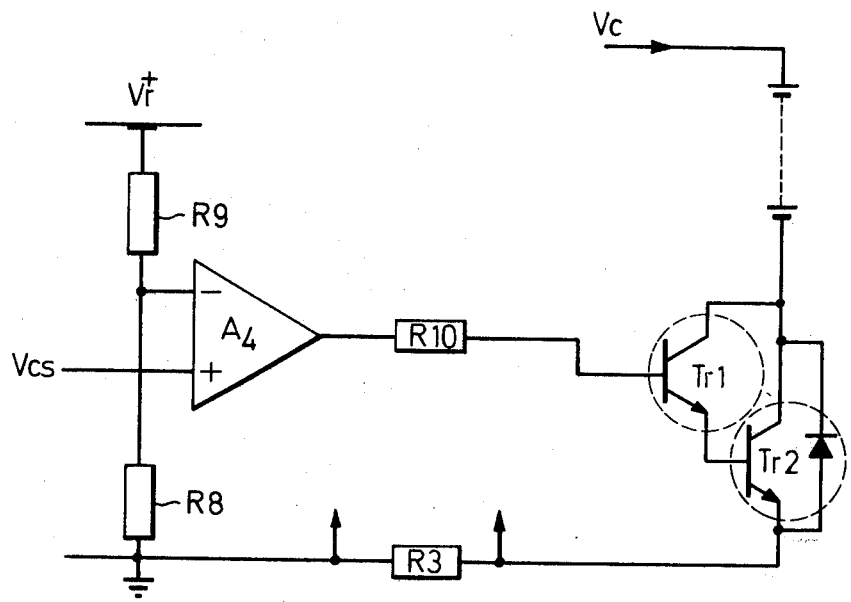
Figure 11:
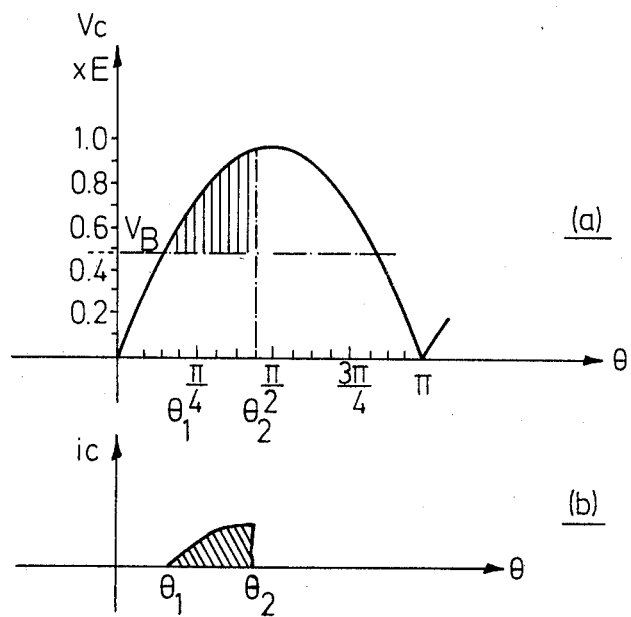
Figure 12:
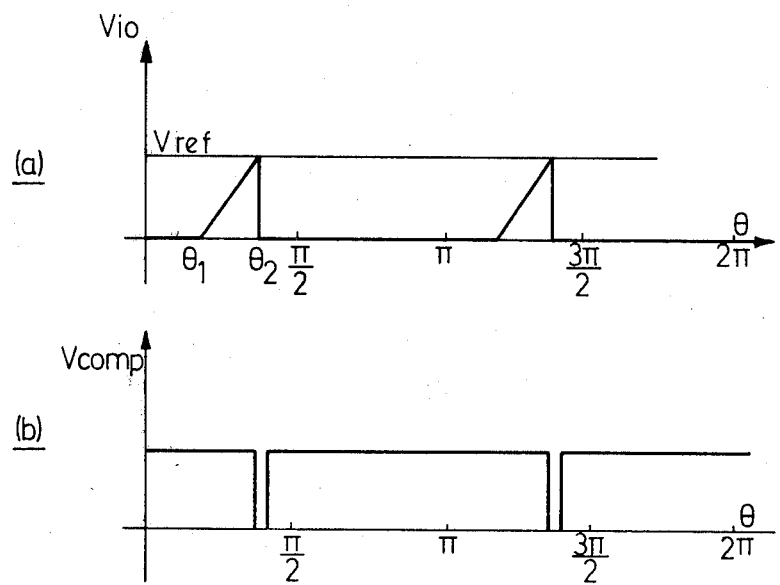

FIGS. 3(a) and 3(b) are graphs of the voltages at stages of the power supply of FIG. 2;

FIG. 4 is a circuit diagram of a battery charging circuit in accordance with the present invention;

FIG. 5 shows the zero voltage detector of the circuit of FIG. 1;

FIG. 6 is a graphical representation of the output of the zero voltage detector of the circuit of FIG. 5;

FIG. 7 shows the integrator of FIG. 1;

FIG. 8 shows the comparator of FIG. 1;

FIG. 9 shows the control circuit of FIG. 1;

FIG. 10 shows the current switch of FIG. 1;

FIGS. 11 (a) and 11 (b) represent graphically the operation of the charging circuit of FIG. 4 over one cycle of the charging voltage;

FIGS. 12(a) and 12(b) represent the output of the integrator and the output of the comparator of FIG. 4; and FIG. 13 shows a modification to the circuit of FIG. 8 which enables dual charge rate control to be applied to the battery.

Referring to FIG. 1, the following description relates to use of the depicted charger when using a full wave rectified supply. Half wave and direct current supplies may also be used as will be described later.

Every time the unfiltered rectified supply 1 drops to zero volts (i.e. the A.C. side crosses zero) the start of cycle detector 2 registers this moment by applying a pulse to the control circuit 7 which in turn switches "ON" the current switch 8. When the voltage of the rectified supply 10 exceeds the battery voltage, charge current will flow through the battery; this current is sensed by the current sense circuit 5. The sensed current 18 is then integrated by the current integrator 4 to provide the total instantaneous charge current at any time while the current flows through battery 9.

The output 14 of the integrator 4 is a voltage proportional to the total charge passed, this voltage is then compared in comparator 6 with a predetermined reference voltage 13 which represents the average charging current required. Average charge current is represented by the total charge passed divided by a fixed period (in this case each half cycle, detected by the zero crossing detector).

On reaching the reference voltage the comparator 6 sends a signal 15 to the current switch control circuit 7 which switches "OFF" the current switch 8 via signal 16 and resets the integrator 4 via signal 17. The current switch 8 will remain "OFF" until switched "ON" again by the start of cycle detector at the beginning of the next half cycle.

The foregoing description is for a contstant, average current charger. To use the current integrator in a constant potential charger, the voltage reference to the comparator is replaced by a voltage sense circuit which continually monitors the battery voltage which causes the charge current to fall as the battery voltage progresses to its fully charged state value. Below the fully charged voltage a maximum reference voltage is applied to the comparator to limit the maximum charge current.

Using only a Half Wave supply the total current seen by the integrator is averaged over the full cycle by using a reference voltage correspnding to that value of current.

Using a Direct Current supply requires the replacing of the zero crossing detector with a stable pulse generator to switch "ON" the current switch at the beginning of the cycle. In this way, the period over which the total current is averaged is set by the pulse generator.

Figure 3:
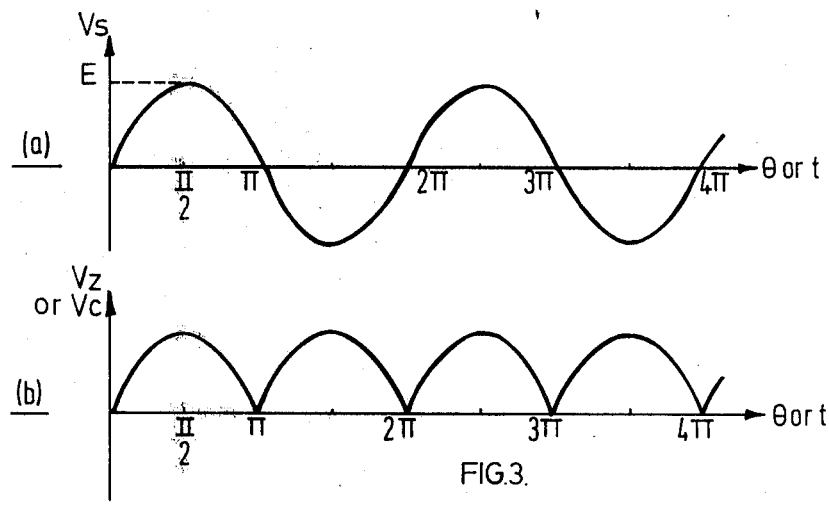

Turning now to FIG. 2 which shows a mains supply of 240 V, 50 Hz a step down transformer is employed with secondary voltage Vs as shown in FIG 3.(a) where $$Vs = E \sin \theta \ldots \tag{1}$$

It will be appreciated that the peak value E should be higher than the battery voltage Vb.

As shown in FIG. 2, there are three output voltages namely Vr, Vz and Vc. Using a bridge rectifier (D1-D4) to obtain a full wave rectified signal which is a periodical signal with period $\pi$ and is a single polarity (positive). This signal is used directly as an input to the start of cycle detector 2 (FIG. 1). In this case, the detector 2 detects the value zero of the full wave rectified signal Vz and so it is called a zero detector taking that the start of the cycle has a zero value. A resistor R1 is used to insure the zero value of Vz while Vs is lower than the forward voltage drop of the diodes. The same signal Vz is used to generate Vc and Vr after using isolation diodes D6 and D5. The output of D6, Vc is used for charging the battery knowing that it is typical of Vz as shown in FIG. 3(b). The output of D5 is filtered using C1 capacitance and regulated using the voltage regulator. Vr, the output regulated voltage is used to supply the other circuit components.

The zero detector shown in FIG. 5 comprises a comparator A1 with two inputs, the noninverting input being connected to ground as a zero reference and the inverting input being connected via resistor R2 to Vz. When Vz is higher than the zero the A1 output is low and when Vz is zero the A1 output is high. The inverter INV 1 is used to condition the signal for use by the control circuit 7 (FIG. 1). The output Vzd is shown in FIG. 6. FIG. 7 depicts the integrator circuit and current sense of FIG. 1. The current sense comprises a small resistance R3 so that the voltage drop is very small compared with Vb and Vc. As the start of the cycle is detected the control circuit 7 (FIG. 1) switches "ON" the current switch 8 (FIG. 1). The current starts of flow only when Vc is larger than Vb. The current flow sensed by R3 is input to the integrator as small voltage drop R3. The integrator is controlled by a signal Vior (integrator-operate-reset) from the control circuit. OPERATE signal makes the analog switch S1 open and the integrator starts to integrate input from R3 and its output is an increasing voltage and represents the integrated current flowing through the battery. This output Vio is used as input to the comparator which is shown in FIG. 8. Reset signal makes S1 closed and so the output Vio becomes zero. The integrator output Vio is shown in FIG. 12(a). As shown in FIG. 7 the integrator is a high gain amplifier A2 where a feedback impedence is the integrating capacitor. C3 and R4, the capacitance and resistance of the integrator, should be chosen much smaller than the supply period for high speed and accuracy of integration.

The comparator FIG. 8 uses a reference voltage supplied by potential divider R7 and R6 and the regulated voltage Vr as a source. The accuracy and stability of this reference circuit comes from two facts, the first is that Vr should be highly regulated and stable, the second is the input impedance of the noninverting input of the comparator A3 is very high. The comparator output Vcomp is shown in FIG. 12(b) which is used as an input to the control circuit of FIG. 9

FIG. 9 depicts the control circuit which comprises a memory circuit (Flip-Flop) with Set and Reset inputs. The circuit uses two NAND gates, the inputs are the comparator output Vcomp FIG. 12(b) and the zero detector output Vzd FIG. 6. The two outputs are, the integrator OPERATE-RESET signal Vior and the current switch signal Vcs which is the complement of Vior.

As shown in FIG. 10. the current switch signal Vcs from the control circuit is not used directly to control the current switch. Amplifier A4 is used as a buffer between the control circuit and the current switch. The current switch is simply a Darlington pair transistor connection to provide high gain and so low driving current.

The operation of the charging circuit of FIG. 4 will now be described with reference to the drawings.

FIG. 11(a) shows one cycle of the charging voltage Vc. As described above, the current switch of FIG. 10 is "ON" at the beginning of the cycle i.e. $\theta$=zero but the current will start to flow according to the value of the battery voltage Vb and it will stop flowing when the current switch is "OFF". This can be summarised as follows:

1. Charging Current=zero: Vc less than or equal Vb
2. Charging Current flowing: Vc larger than Vb
3. Charging Current=zero: Current switch is "OFF"

These three states occur in sequence in one cycle and it repeats every cycle. State 3 is determined by the comparator according to the output of the integrator. The output of the integrator FIG. 12(a) depends on the current flow FIG. 11(b). As shown in FIG. 11 the current flows between $\theta 1$ and $\eta 2$. The current starts to flow at $\theta 1$ and stops at $\theta 2$, $\theta 2$ can be known from equation (1) as $$Vc = Vb = E \sin \theta 1 \qquad (2)$$

Considering the current switch is ideal, the voltage drop on the current sense R3 will be (Vc−Vb). The average current is then $$Iav = \frac{1}{\pi} \int_{\theta 1}^{\theta 2} \frac{Vc - Vb}{R3} d\theta \qquad (3)$$

From FIG. 7 it is shown that the input to the integrator amplifier A2 is the voltage drop on R3 which is Vc−Vb. The integrator output Vio will be $$Vi_o = (Vc - Vb) + \frac{R3}{2fR4C3} \cdot \frac{1}{\pi} \int_{\theta 1}^{\theta 2} \frac{Vc - Vb}{R3} d\theta \qquad (4)$$

Then
$$Vio \simeq K \, Iav \qquad (5)$$

As shown above Vio is related to the average current (or the amount of charge flowing through the battery) by a nearly linear relationship.

Dual charge rate control can be added to the circuit by using a timer set to the period required for high charge. The timer output controls switch S2 which is connected in the comparator circuit as shown in FIG. 13. This analog switch S2 and the resistor R11 are added to change the reference and so the charging current required.

When using a dual rate of charge arrangement in emergency systems, a memory may be used to memorize the emergency period and accordingly control the analog switch S2 for high charge rate period relative to the emergency period and then control it for the low charge rate.

The embodiment described uses a periodical supply for charging batteries but if the available supply is dc voltage the integrating charger may still be used by generating a pulse signal, such as free running square wave signal, to control the start of integration at fixed intervals (the cycle periods of the generated square wave). The stop of integration is controlled by the comparator and the control circuit as described above.

It will be appreciated that MICROPROCESSORS can be used as the control circuit. In that case a MICROPROCESSOR may be used for controlling more than one charger for different sets of batteries. In which case, the MICROPROCESSOR will receive information about the start of cycle (synchronization pulse) and the charging current status. This information comes from different chargers individually; the MICRO- PROCESSOR recognizes it, analyzes it, and sends the required control signal to the relevant charger.

A major advantage of the present invention is in Alternating Current applications.

By using the present invention it can be seen that the constant, average current is independent of supply voltage, waveform and frequency, with the only limitation to frequency being the speed of the circuitry.

An example showing its advantage may be where a charging system of the present invention was designed to charge a 12 cell, 24 volt, 20 amp hour lead acid battery system; only the voltage sense circuit to sense the new terminal voltage need be changed to charge a 20 amp hour Lead Acid system using 1 to 12 cells without any noticeable increase in circuit losses. This enables a manufacturer to standardise on a single power transformer instead of a different transformer for each system.

For different types of batteries only the current sense and voltage reference/sense circuits need be changed to adapt to the batteries, with only a minimum change in supply transformers.

The current integrating arrangement of the invention has an additional resultant advantage of protection from short circuiting.

We claim:

1. In a battery charging circuit, current integrating means, battery charging current sense means supplying the sensed current flow through a battery being charged to said current integrating means, a current switch, control circuit means controlling said current switch in series with said battery and controlling periodic starting and resetting of said integrating means, and wherein charging current flows through the battery, the current switch and the current sense means when the voltage of the charging current exceeds the battery voltage after the start of each period, comparator means for comparing the output of the integrating means with a predetermined charging current level, said comparator means being connected to said control circuit means which open circuits said current switch and resets the integrating means when the output of the integrating means attains said predetermined charging current level.

2. In a battery charging circuit as claimed in claim 1, wherein said control circuit means comprises a flip-flop formed by two NAND gates having set and reset inputs.

3. In a battery charging circuit as claimed in claim 1 or 2, wherein the periodic starting of said integrating means corresponds to the zero voltage level of a full wave rectified alternating current charging signal.

4. In a battery charging circuit as claimed in claim 1 or 2, wherein the current switch comprises a Darlington pair transistor connection.

5. In a battery charging circuit as claimed in claim 1 or 2, wherein said current sense means comprises a small resistance.

6. In a battery charging circuit as claimed in claim 1, further including a pulse generator and wherein the periodic starting of said integrating means corresponds to periodic signal pulses from said pulse generator.

7. In a battery charging circuit as claimed in claim 1, further comprising dual charge rate control means.

8. In a battery charging circuit as claimed in claim 7, wherein said dual charge rate control means comprises a timer controlling a switch which is operable to vary the reference signal to the comparator means.

* * * * *